United States Patent
Forgang

(10) Patent No.: US 9,158,025 B2
(45) Date of Patent: Oct. 13, 2015

(54) PAD DEVICE FOR RESISTIVITY IMAGING IN THE WELLS WITH OIL BASED DRILLING FLUID

(75) Inventor: Stanislav W. Forgang, Houston, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 153 days.

(21) Appl. No.: 13/230,274

(22) Filed: Sep. 12, 2011

(65) Prior Publication Data

US 2012/0068711 A1 Mar. 22, 2012

Related U.S. Application Data

(60) Provisional application No. 61/383,593, filed on Sep. 16, 2010.

(51) Int. Cl.
*G01V 3/18* (2006.01)
*G01V 3/20* (2006.01)

(52) U.S. Cl.
CPC .................... *G01V 3/20* (2013.01)

(58) Field of Classification Search
CPC ........................................ G01V 3/20
USPC ................................ 324/323–375
See application file for complete search history.

(56) References Cited

U.S. PATENT DOCUMENTS

| | | | |
|---|---|---|---|
| 2,986,694 A * | 5/1961 | Stricklin, Jr. | 324/347 |
| 4,739,272 A * | 4/1988 | Griffin et al. | 324/339 |
| 6,191,588 B1 * | 2/2001 | Chen | 324/367 |
| 6,396,276 B1 | 5/2002 | Steenwyk et al. | |
| 7,242,194 B2 | 7/2007 | Hayman et al. | |
| 7,382,136 B2 | 6/2008 | Hayman | |
| 7,437,251 B2 | 10/2008 | Wang et al. | |
| 7,525,315 B2 | 4/2009 | Fredette et al. | |
| 7,573,780 B2 | 8/2009 | Thompson et al. | |
| 7,579,841 B2 | 8/2009 | San Martin et al. | |
| 7,612,567 B2 | 11/2009 | Itskovich et al. | |
| 7,639,016 B2 | 12/2009 | Forgang | |
| 7,696,756 B2 * | 4/2010 | Morys et al. | 324/366 |
| 7,797,111 B2 | 9/2010 | Forgang et al. | |
| 8,014,963 B2 | 9/2011 | Wang et al. | |
| 2004/0245991 A1 | 12/2004 | Hayman et al. | |
| 2006/0103388 A1 * | 5/2006 | Forgang et al. | 324/338 |
| 2006/0238202 A1 * | 10/2006 | Gorek et al. | 324/373 |
| 2008/0272789 A1 * | 11/2008 | San Martin et al. | 324/355 |
| 2008/0303525 A1 | 12/2008 | Itskovich et al. | |
| 2011/0089951 A1 | 4/2011 | Wang | |
| 2011/0156711 A1 | 6/2011 | Wang | |

OTHER PUBLICATIONS

PCT/US2011/051358: Baker Hughes Incorporated et al.; International Search Report dated Feb. 28, 2012.

* cited by examiner

*Primary Examiner* — Arleen M Vazquez
*Assistant Examiner* — Robert P Alejnikov, Jr.
(74) *Attorney, Agent, or Firm* — Mossman Kumar & Tyler PC

(57) ABSTRACT

An apparatus and method for reducing coupling between at least one measure electrode and at least one return electrode in a logging tool in a borehole with non-conductive drilling fluid using a conductive shield disposed between the at least one measure electrode and the at least one return electrode. The apparatus may be configured to impart an electrical current into a formation and to receive a return current from the formation. The method may include using the apparatus.

12 Claims, 5 Drawing Sheets

PAD DEVICE FOR RESISTIVITY IMAGING IN THE WELLS WITH OIL BASED DRILLING FLUID

CROSS-REFERENCES TO RELATED APPLICATIONS

This application claims priority from U.S. Provisional Patent Application Ser. No. 61/383,593, filed on Sep. 16, 2010, the disclosure of which is incorporated herein by reference in its entirety.

FIELD OF THE DISCLOSURE

This disclosure generally relates to exploration for hydrocarbons involving electrical investigations of a borehole penetrating an earth formation. More specifically, this disclosure relates to reducing coupling between a measure electrode and a return electrode in a logging tool in a borehole with non-conductive drilling fluid by using a conductive shield disposed between the measure electrode and the return electrode.

BACKGROUND OF THE DISCLOSURE

Electrical earth borehole logging is well known and various devices and various techniques have been described for this purpose. Broadly speaking, there are two categories of devices used in electrical logging devices. In the first category, a transmitter (such as a current electrode) is uses in conjunction with a diffuse return electrode (such as the tool body). A measured electric current flows in a circuit that connects a current source to the transmitter, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure belongs to the first category.

With tools in the first category, it is desirable for the measure electrodes and the return electrodes to remain uncoupled, such that the current follows a path through the earth formation. This disclosure addresses reducing coupling between a measure electrode and a return electrode.

SUMMARY OF THE DISCLOSURE

In aspects, the present disclosure is related to methods and apparatuses for reducing electric current leakage during borehole investigations involving electric current injected into a wall of the borehole.

One embodiment according to the present disclosure includes a method of conducting logging operations, the method comprising: reducing coupling between at least one measure electrode and at least one return electrode in a logging tool in a borehole with non-conducting drilling fluid using a conductive shield between the at least one measure electrode and the at least one return electrode.

Another embodiment according to the present disclosure includes an apparatus for reducing electric current leakage in a logging tool comprising: a carrier; and a logging tool disposed on the carrier, the logging tool comprising: at least one measure electrode; at least one return electrode; and a conductive shield disposed between the at least one measure electrode and the at least one return electrode and configured to reduce coupling between the at least one measure electrode and the at least one return electrode, where the logging tool is in a borehole with non-conducting drilling fluid.

Examples of the more important features of the disclosure have been summarized rather broadly in order that the detailed description thereof that follows may be better understood and in order that the contributions they represent to the art may be appreciated.

BRIEF DESCRIPTION OF THE DRAWINGS

For a detailed understanding of the present disclosure, reference should be made to the following detailed description of the embodiments, taken in conjunction with the accompanying drawings, in which like elements have been given like numerals, wherein.

DETAILED DESCRIPTION

This disclosure generally relates to exploration for hydrocarbons involving electrical investigations of a borehole penetrating an earth formation. More specifically, this disclosure relates to reducing electric current leakage during borehole investigations involving electric current injected into a wall of the borehole.

Figure 1:
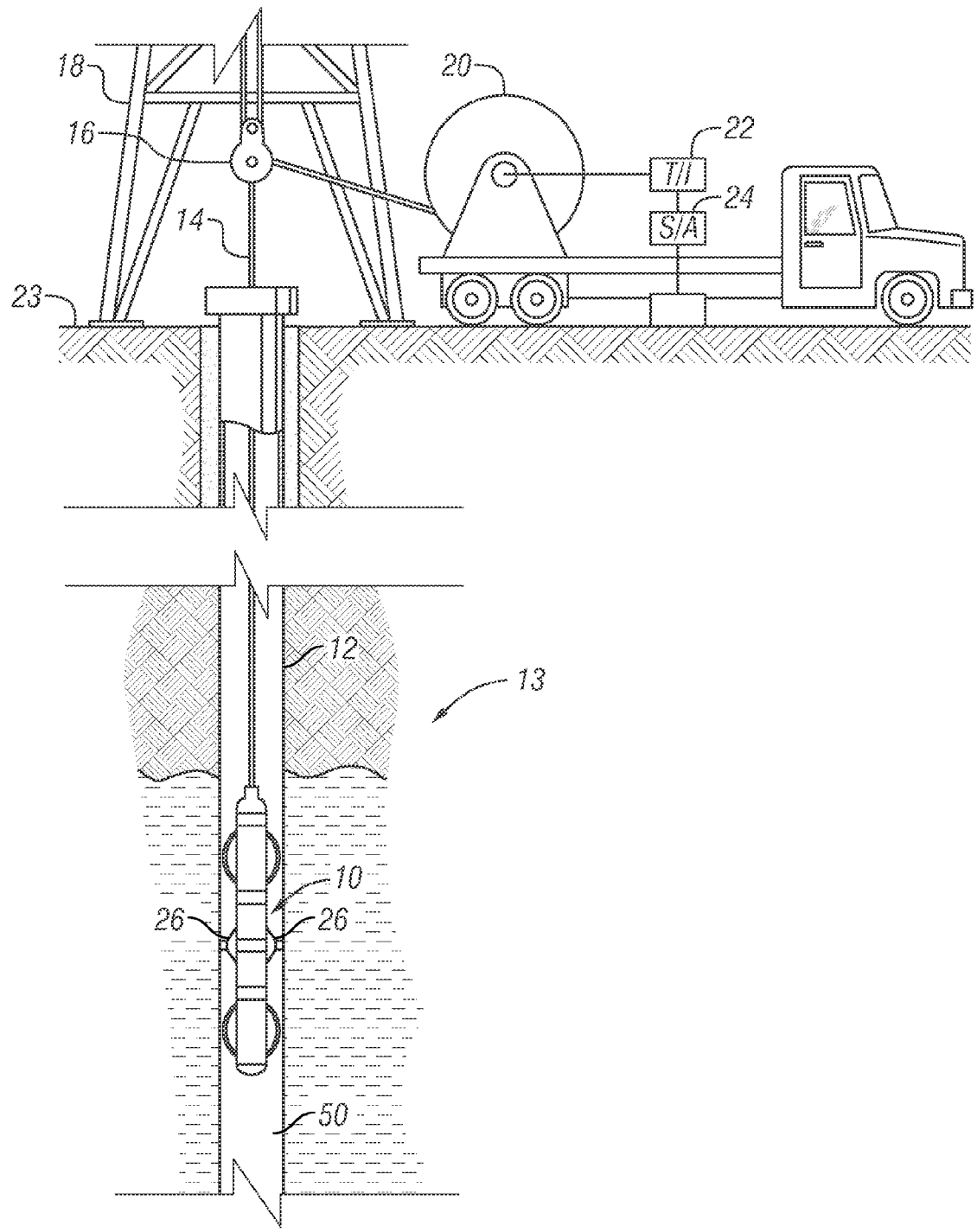
FIG. 1 shows a schematic of an imaging tool deployed in a wellbore along a wireline according to one embodiment of the present disclosure.

FIG. 1 shows an exemplary imaging tool 10 suspended in a borehole 12, which penetrates earth formations such as 13, from a carrier 14 that passes over a sheave 16 mounted on drilling rig 18. Carrier 14 may be rigid or non-rigid. Imaging tool 10 may be coupled or combined with additional tools. In this example, the tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. While a wireline conveyance system has been shown, it should be understood that embodiments of the present disclosure may be utilized in connection with tools conveyed via rigid carriers (e.g., jointed tubular or coiled tubing) as well as non-rigid carriers (e.g., wireline, slickline, e-line, etc.).

Imaging tool 10 may be in contact with earth formation 13 when performing various measurement operations. The point of contact may be a resistivity array 26 in contact with the earth formation 13. This resistivity array 26 may be retractable such that, when the resistivity array 26 is not in contact with the earth formation 13, the resistivity array 26 may still be in contact with wellbore drilling fluid 50 that resides within the borehole 12.

Figures 2A, 2B:
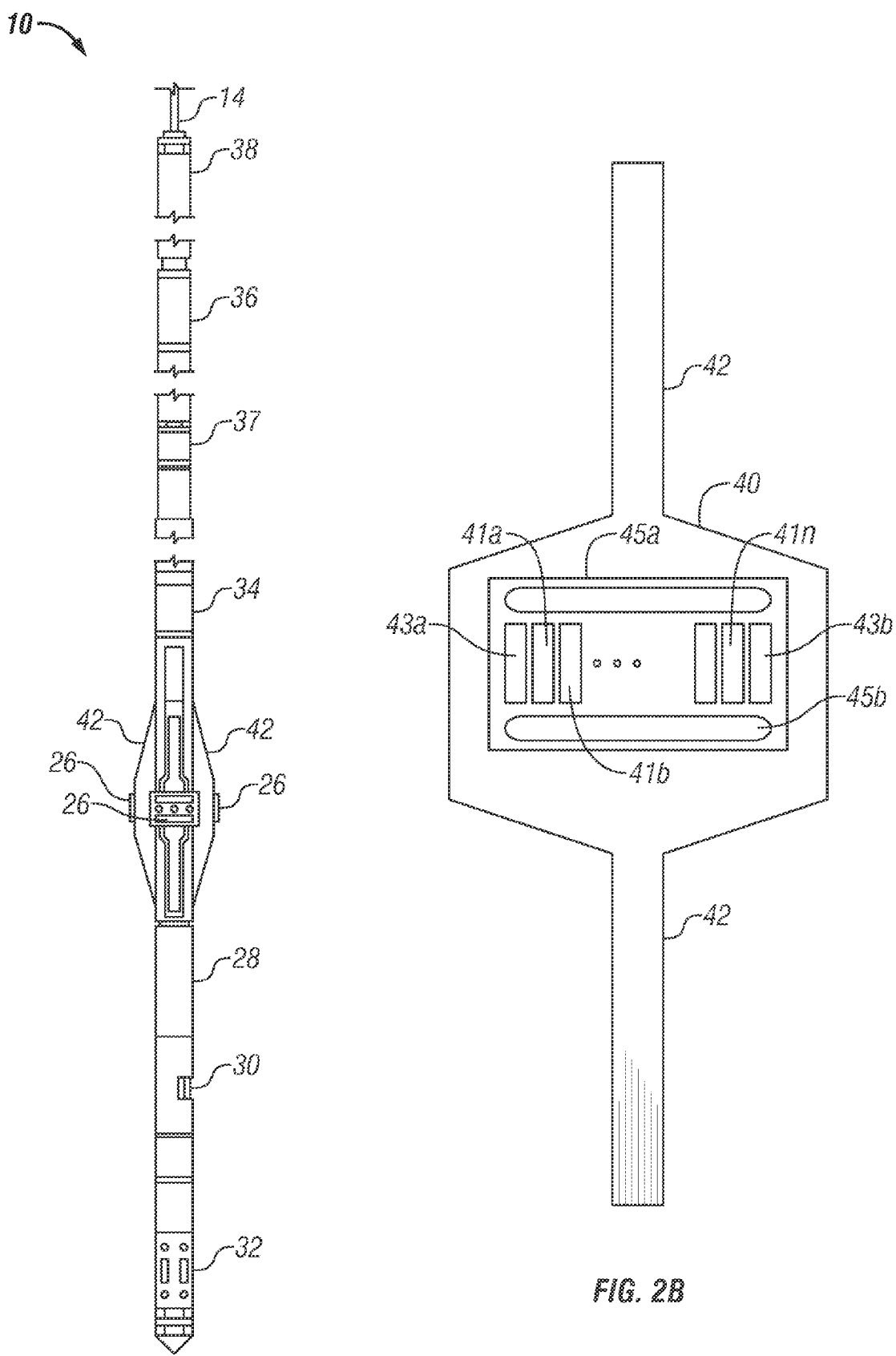
FIG. 2A shows a schematic close up of an imaging tool deployed in a wellbore according to one embodiment of the present disclosure.
FIG. 2B shows a schematic close up of a resistivity array according to one embodiment of the present disclosure.

FIG. 2A shows a schematic external view of an exemplary borehole sidewall imager tool 10. The tool 10 comprising the imager system may include resistivity arrays 26 and, optionally, a mud cell 30 and a circumferential acoustic televiewer 32. The resistivity arrays 26 may be secured to extendable arms such as 42. Hydraulic or spring-loaded caliper-arm actuators (not shown) of any well-known type extend the pads 40 and their electrodes 41, 43, 45 against the borehole 12 sidewall for resistivity measurements. In addition, the extendable caliper arms 42 provide the actual measurement of the borehole diameter as is well known in the art. Electronics modules 28 and 38 may be located at suitable locations in the system and not necessarily in the locations indicated. The components may be mounted on a mandrel 34 in a conventional well-known manner. The outer diameter of the assembly is about 5 inches and about fifteen feet long. An orientation module 36 including a magnetometer and an accelerometer or inertial guidance system may be mounted above the imaging assemblies 26 and 32. The electronics module 38 of the tool 10 may include a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22. Imaging tool 10 may also include an optional biasing element (not shown), which may have a voltage impressed upon it to influence the path that electric current may use while the resistivity arrays 26 are active. The optional biasing element may be part of the exterior of the imaging tool 10 or located elsewhere along the carrier 14. In some embodiments, the optional biasing element may be part of or attached to mandrel 34.

Also shown in FIG. 2A are three resistivity arrays 26 (a fourth array is hidden in this view). Referring to FIGS. 2A and 2B, each array includes one or more measure electrodes 41a, 41b, . . . 41n (collectively 41) for injecting electrical currents into the formation, The mandrel holding pads 40 with measuring electrodes 41, 43 may be isolated from the electronics module 36 by an isolator section such as 37 (FIG. 2A) that may be at least 2'6" long. Electrodes 43a,b may be at an identical electrical potential as measure electrodes 41.

Figure 3:
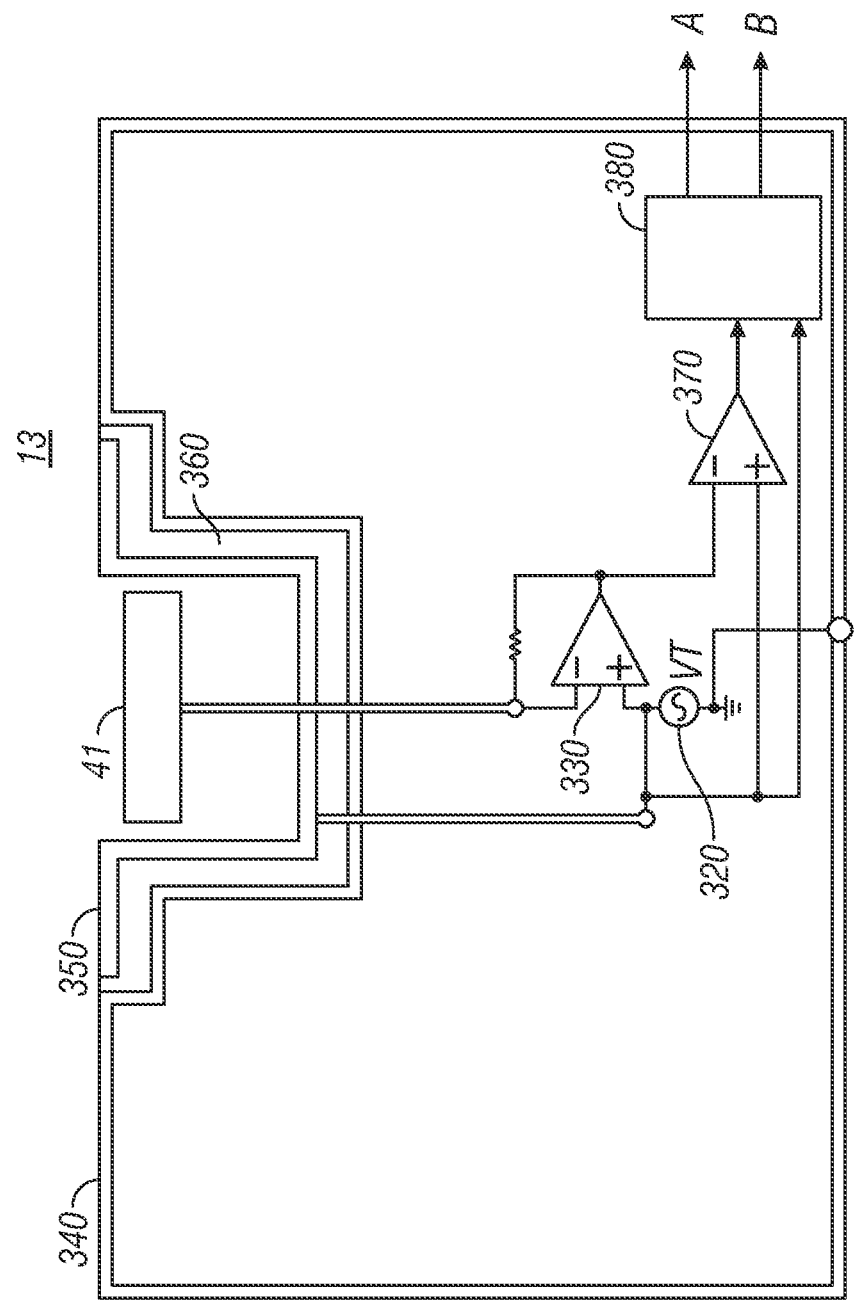
FIG. 3 shows an equivalent circuit diagram of the imaging tool according one embodiment of the present disclosure.

FIG. 3 shows an equivalent circuit of one embodiment of an exemplary resistivity array 26 according to the present disclosure. In some embodiments, as shown in FIG. 3, a pad body 340 may serve as a return electrode, which may replace or augment return electrodes 45a,b. When using a pad body 340 in place of return electrodes 45a,b, all current emitted from the measure electrodes 41 may return through pad body 340. The biasing element mentioned the above could prevent partial leak of the emitted current to the mandrel, however, this biasing element is optional.

At least one measure electrode 41 may be electrically connected to a power source 320 through a first input and an output of a converter 330. Power source 320 may be a voltage source or a current source. In some embodiments, the converter 330 may be a current-to-voltage converter. Current imparted from the at least one measurement electrode 41 into formation 13 may return through pad body 340. A conductive shield 350 may be disposed between the at least one measurement electrode 41 and the pad body 340. The conductive shield 350 may reduce stray coupling between the at least one measurement electrode 41 and the pad body 340. The conductive shield 350 may be formed at least in part of a conductive material such that the conductive shield 350 exhibits the Faraday effect in reducing or preventing the passage of electric current between the at least one measurement electrode 41 and the pad body 340. An exemplary conductive shield 350 may be, but is not limited to, one of: (i) a solid form and (ii) a mesh. The conductive shield 350 may be biased through coupling with power supply 320 at the voltage of the second input of converter 330. In some embodiments, the conductive shield 350 may be biased at a voltage other than the voltage of the second input of converter 330. In some embodiments, the conductive shield 350 may be biased at a voltage identical to the voltage of the at least one measurement electrode 41. An electrical isolator 360 may also be disposed between the at least one measurement electrode 41 and the pad body 340. The electrical isolator 360 may be positioned closer or farther from the at least one measurement electrode 41 than the conductive shield 350. The conductive shield 350 may be electrically coupled to a second input of converter 330. The output of converter 330 may also be electrically coupled to a first input of a differential amplifier 370. The second input of the differential amplifier 370 may be electrically coupled to voltage source 320. The output of the differential amplifier 370 and the voltage source 320 may both be inputs to a gain/phase detector 380, which may be configured to output information indicative of a resistivity property of the formation 13.

Figure 4:
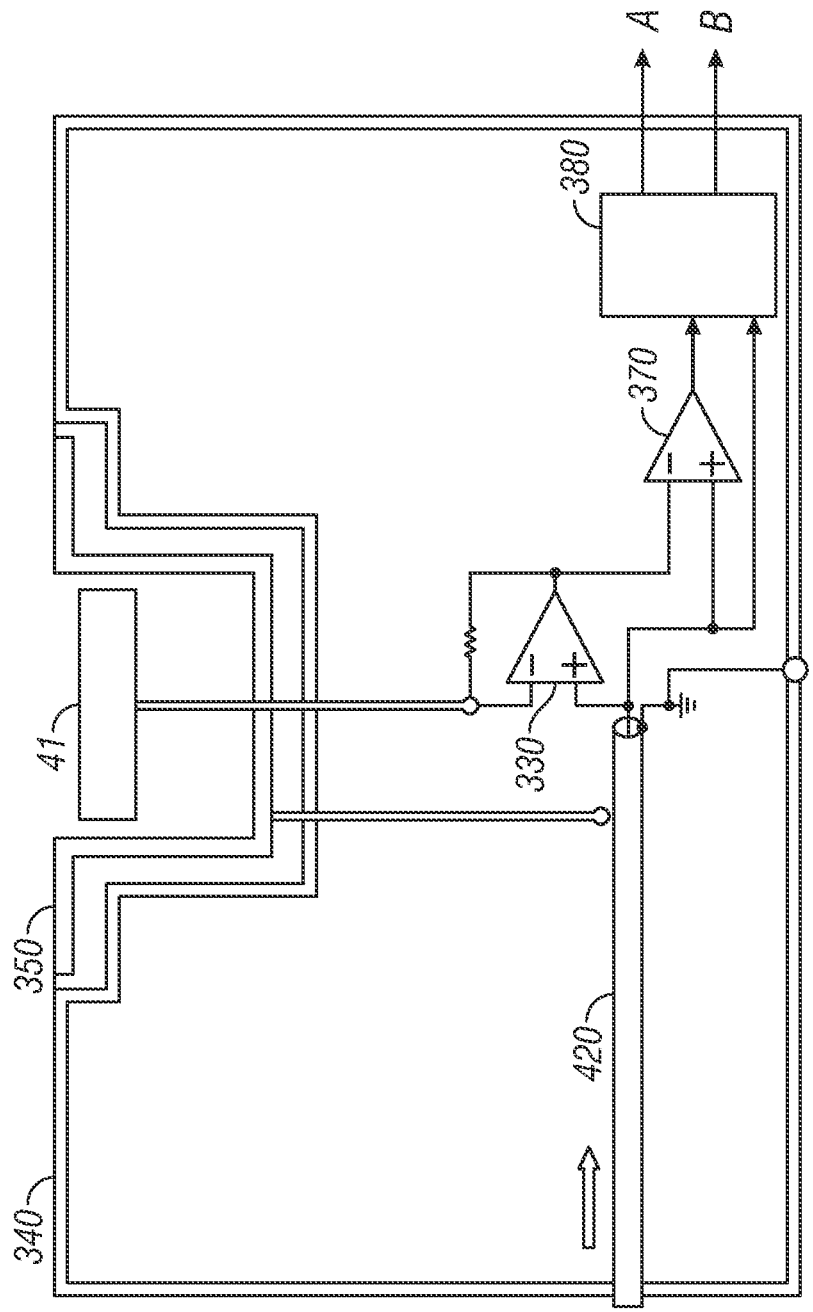
FIG. 4 shows an equivalent circuit diagram of the imaging tool according another embodiment of the present disclosure.

FIG. 4 shows another equivalent circuit of one embodiment of a resistivity array 26 according to the present disclosure. In this embodiment, voltage source 320 may be replaced by a voltage circuit 530 receiving power from an external voltage source (not shown).

Figure 5:
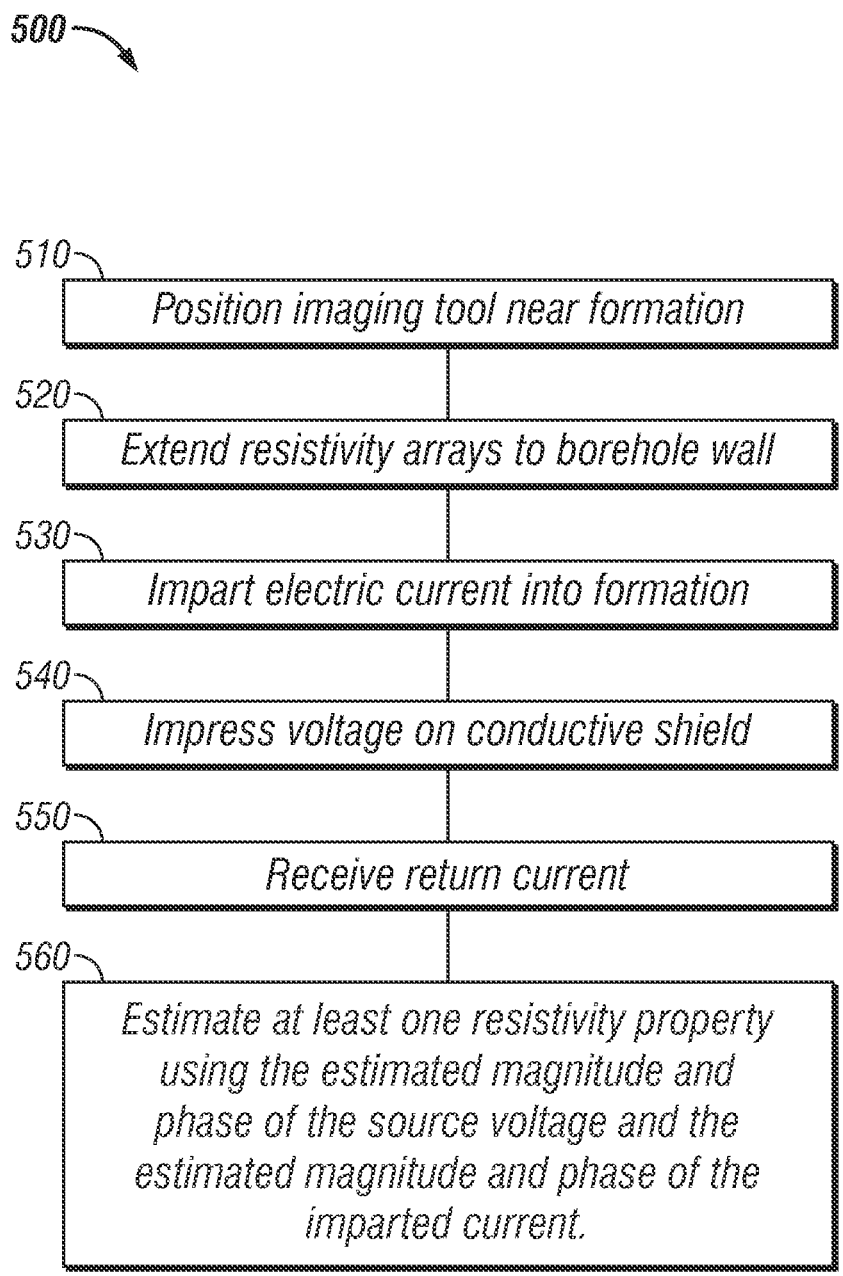
FIG. 5 shows a flow chart of a method for reducing coupling in an imaging tool according to one embodiment of the present disclosure.

FIG. 5 shows an exemplary method 500 according to one embodiment of the present disclosure. In method 500, an imaging tool 10 is positioned within a borehole 12 adjacent to a formation 13 in step 510. Then, in step 520, resistivity arrays 26 are extended to the borehole wall 12. In step 530, an electric current may be imparted into the formation 13 through at least one measure electrode 41. In step 540, a voltage may be impressed on the conductive shield 350 from power source 320. In some embodiments, the voltage impressed on the conductive shield may be different from the output of power source 320. In some embodiments, step 540 may not be performed. In step 550, a return current from the formation due to the imparted current may be received by at the pad body 340. The imparted current phase may be derived with respect to the phase of source voltage from the power source 320, i.e., the phase of the source voltage may be assumed to be 0 degrees. In step 560, the magnitude of the source voltage together with the magnitude and phase of the imparted current may be used to estimate at least one formation resistivity parameter. The relationship between the source voltage and the imparted current may be expressed as a complex impedance. Method 500 may be performed using multiple measure electrodes sequentially or simultaneously.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface, by using one or more processors. In addition, results of the processing, such as an image of a resistivity property, can be stored on a suitable medium.

While the foregoing disclosure is directed to particular embodiments of the disclosure, various modifications will be apparent to those skilled in the art. It is intended that all variations be embraced by the foregoing disclosure.

I claim:

1. A method of conducting logging operations in a borehole intersecting an earth formation, the borehole filled with non-conducting drilling fluid, the method comprising:

applying a bias voltage to a conductive shield using a power source, the bias voltage being the same as a voltage of at least one measure electrode; and reducing coupling between the at least one measure electrode and at least one return electrode in a logging tool in the borehole using the conductive shield between the at least one measure electrode and the at least one return electrode, the at least one measure electrode electrically coupled in circuit with the power source and the earth formation to inject current into the non-conducting drilling fluid and the earth formation, and the at least one return electrode electrically coupled in circuit with the earth formation to receive current returning from the earth formation and the non-conducting drilling fluid.

2. The method of claim 1, further comprising:

positioning the logging tool in the borehole in an earth formation; and energizing the at least one measure electrode to impart the electric current into the earth formation.

3. The method of claim 2, using, to energize the at least one measure electrode, the power source.

4. The method of claim 3, wherein the power source is a voltage source.

5. The method of claim 1, further comprising: estimating a parameter of interest of the earth formation using a measurement of the injected current and a voltage of the power source capable of being expressed as a complex impedance.

6. An apparatus for conducting logging operations in a borehole intersecting an earth formation, the borehole filled with non-conducting drilling fluid, comprising:

a carrier configured for conveyance in the borehole; and a logging tool disposed on the carrier, the logging tool comprising:

at least one measure electrode electrically coupled in circuit with a power source and the earth formation to inject current into the non-conducting drilling fluid and the earth formation;

at least one return electrode electrically coupled in circuit with the earth formation to receive current returning from the earth formation; and a conductive shield disposed between the at least one measure electrode and the at least one return electrode and configured to reduce coupling between the at least one measure electrode and the at least one return electrode, wherein the power source is configured to apply a bias voltage to the conductive shield, the bias voltage being the same as a voltage of the at least one measure electrode.

7. The apparatus of claim 6, wherein:

the power source is configured to provide an electric voltage to the at least one measure electrode.

8. The apparatus of claim 7, wherein the power source is disposed in the logging tool.

9. The apparatus of claim 7, wherein the power source is a voltage source.

10. The apparatus of claim 6, wherein the carrier is one of: (i) a wireline, and (ii) a drilling tubular.

11. The apparatus of claim 6, further comprising an electrical isolator disposed between the at least one measure electrode and the at least one return electrode.

12. The apparatus of claim 6, further comprising: a processor configured to estimate the parameter of interest of the earth formation using a measurement of the injected current and a voltage of the power source capable of being expressed as a complex impedance.

* * * * *